United States Patent
Soga et al.

(10) Patent No.: US 7,568,995 B2
(45) Date of Patent: Aug. 4, 2009

(54) SHIFT CONTROL DEVICE AND SHIFT CONTROL METHOD OF VEHICULAR CONTINUOUSLY VARIABLE TRANSMISSION

(75) Inventors: Yoshinobu Soga, Toyota (JP); Yusuke Ogata, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 252 days.

(21) Appl. No.: 11/826,149

(22) Filed: Jul. 12, 2007

(65) Prior Publication Data

US 2008/0039279 A1    Feb. 14, 2008

(30) Foreign Application Priority Data

Aug. 11, 2006   (JP)   ............................. 2006-220385

(51) Int. Cl.
*F16H 61/00* (2006.01)
*F16H 15/38* (2006.01)
*F16H 61/664* (2006.01)

(52) U.S. Cl. .......................................... 477/45; 477/50

(58) Field of Classification Search ................... 477/45, 477/46, 38, 50

See application file for complete search history.

(56) References Cited

U.S. PATENT DOCUMENTS

| | | | | | |
|---|---|---|---|---|---|
| 4,584,909 | A | * | 4/1986 | Abo et al. | ...................... 477/41 |
| 4,923,433 | A | * | 5/1990 | Tanaka et al. | .................. 474/11 |
| 5,052,980 | A | * | 10/1991 | Itoh et al. | ...................... 474/11 |
| 6,146,308 | A | * | 11/2000 | Taniguchi et al. | ............. 477/48 |

FOREIGN PATENT DOCUMENTS

| | | |
|---|---|---|
| JP | A-9-210158 | 8/1997 |
| JP | A-11-82701 | 3/1999 |
| JP | A-2001-330112 | 11/2001 |
| JP | A 2005-42799 | 2/2005 |

\* cited by examiner

*Primary Examiner*—Tisha D Lewis
(74) *Attorney, Agent, or Firm*—Oliff & Berridge, PLC

(57) ABSTRACT

A hydraulic control circuit that shuts off an oil passageway so that the ratio between the shift pressure and the belt clamping pressure is not caused to be in a predetermined relationship even when a speed change ratio control valve and/or a speed change ratio control valve are not supplying/discharging hydraulic oil. Therefore, even if the speed change ratio control valve and/or the speed change ratio control valve cease supplying/discharging the hydraulic oil, the action of a thrust ratio control oil pressure Pτ output from a thrust ratio control valve on a primary hydraulic cylinder is avoided. Thus, impairment of the continuity of control at the time of a shift of the continuously variable transmission is prevented.

2 Claims, 6 Drawing Sheets

SHIFT CONTROL DEVICE AND SHIFT CONTROL METHOD OF VEHICULAR CONTINUOUSLY VARIABLE TRANSMISSION

INCORPORATION BY REFERENCE

The disclosure of Japanese Patent Application No. 2006-220385 filed on Aug. 11, 2006 including the specification, drawings and abstract is incorporated herein by reference in its entirety.

BACKGROUND OF THE INVENTION

1. Field of the Invention

The invention relates to a shift control device and a shift control method of a vehicular continuously variable transmission that has a primary pulley, a secondary pulley and a belt wrapped around the two pulleys. More particularly, the invention relates to a shift control device and a shift control method of a vehicular continuously variable transmission equipped with a hydraulic circuit that has a pressure reducing valve for causing the ratio between the oil pressure in a primary hydraulic cylinder and the oil pressure in a secondary hydraulic cylinder to be in a predetermined relationship by causing a predetermined oil pressure to act on the primary hydraulic cylinder when the hydraulic oil supplying/discharging operation by a shift control valve is not performed.

2. Description of the Related Art

Among shift control devices of belt type continuously variable transmissions that have a primary pulley, a secondary pulley and a belt wrapped around the two pulleys, a well-known shift control device is equipped with a hydraulic circuit having a shift control valve that adjusts the amount of hydraulic oil supplied to or discharged from a primary hydraulic cylinder for altering the groove width of a primary pulley in order to shift the continuously variable transmission, and a pressure reducing valve that causes the ratio between the oil pressure in the primary hydraulic cylinder and the oil pressure in a secondary hydraulic cylinder for altering the groove width of a secondary pulley to be in a predetermined relationship by causing a predetermined oil pressure to act on the primary hydraulic cylinder when the hydraulic oil supplying/discharging operation by the shift control valve is not performed.

An example of the aforementioned device is a hydraulic control device of a continuously variable transmission described in Japanese Patent Application Publication No. JP-A-2005-42799. This patent application proposes a hydraulic control device of a belt type continuously variable transmission equipped with a hydraulic circuit capable of causing the speed change ratio to become a maximum speed change ratio by executing a so-called closing-in control of causing the ratio between the oil pressure in the primary hydraulic cylinder and the oil pressure in the secondary hydraulic cylinder to be in a predetermined relationship while causing a predetermined oil pressure to act on the primary hydraulic cylinder when the hydraulic oil supplying/discharging operation by the shift control valve is not performed. This hydraulic control device is designed to establish the maximum speed change ratio by the closing-in control at the time of launch from a stopped state of the vehicle so as to prevent the speed change ratio from changing toward the speed increase side (upshift side) and therefore realize good launching performance.

In the case where in a hydraulic circuit as proposed in Japanese Patent Application Publication No. JP-A-2005-42799, a shift is performed by a feedback control so that a target value and the actual value of the rotational speed of a predetermined rotating member or the like become equal to each other, the hydraulic oil supplying/discharging operation by the shift control valve ceases to be performed as the actual value approaches target value. Then, a predetermined oil pressure is caused to act on the primary hydraulic cylinder by the pressure reducing valve.

This operation, however, has a probability of causing a shift to be performed when there is no need for a shift. For example, at the time of a downshift by the feedback control, when the actual value approaches the target value, there is a possibility of the action of a predetermined oil passageway causing a sharp downshift toward the maximum speed change ratio. Furthermore, at the time of an upshift by the feedback control, when the actual value approaches the target value, there is a possibility that the supply of hydraulic oil to the primary hydraulic cylinder by the pressure reducing valve may cause a sharp upshift. Therefore, there is a possibility of giving rise to a problem of impairing the continuity of the control at the time of a shift.

SUMMARY OF THE INVENTION

The invention provides a shift control device and a shift control method of a vehicular continuously variable transmission capable of preventing impairment of the continuity of control at the time of a shift.

A first aspect of the invention relates to a shift control device of a vehicular continuously variable transmission as follows. A vehicle has, in a power transmission path between a vehicle power source and a driving wheel, a vehicular continuously variable transmission that has a primary pulley, a secondary pulley and a belt wrapped around the two pulleys, and that also has a primary hydraulic cylinder for altering a groove width of the primary pulley and a secondary hydraulic cylinder for altering the groove width of the secondary pulley. The shift control device of the vehicular continuously variable transmission is equipped with a hydraulic circuit and a pressure reducing valve. The hydraulic circuit has a shift control valve that adjusts an amount of hydraulic oil supplied to or discharged from the primary hydraulic cylinder in order to shift the continuously variable transmission. The pressure reducing valve causes a ratio between an oil pressure in the primary hydraulic cylinder and the oil pressure in the secondary hydraulic cylinder to be in a predetermined relationship, for example, such a relationship that a speed change ratio of the continuously variable transmission is caused to be a maximum speed change ratio, by causing a predetermined oil pressure to act on the primary hydraulic cylinder when a hydraulic oil supplying/discharging operation by the shift control valve is not performed. In this shift control device, the hydraulic circuit is constructed so as to be capable of shutting off an oil passageway connecting an output port of the pressure reducing valve and the primary hydraulic cylinder so that the ratio is not changed to the predetermined relationship even when the hydraulic oil supplying/discharging operation by the shift control valve is not performed.

Thus, the hydraulic circuit is constructed to shut off the oil passageway connecting the output port of the pressure reducing valve and the primary hydraulic cylinder so that the ratio between the oil pressure in the primary hydraulic cylinder and the oil pressure in the secondary hydraulic cylinder is not caused to be in a predetermined relationship even when the hydraulic oil supplying/discharging operation by the shift control valve is not performed. Therefore, even if the hydraulic oil supplying/discharging operation by the shift control valve is no longer performed, the action of a predetermined oil pressure output from the pressure reducing valve on the primary hydraulic cylinder is avoided. Hence, impairment of the continuity of control when the continuously variable transmission is shifted can be prevented.

In the first aspect, the hydraulic circuit is constructed so that the shift control valve shuts off the oil passageway, and the shift control valve is selectively switchable between a first state, in which the hydraulic oil supplying/discharging operation is performed and the oil passageway is shut off; a second state, in which the hydraulic oil supplying/discharging operation is not performed and the oil passageway is shut off; and a third state, in which the hydraulic oil supplying/discharging operation is not performed and the oil passageway is opened. Therefore, while maintaining the functions of shifting the continuously variable transmission by adjusting the amount of hydraulic oil supplied to or discharged from the primary hydraulic cylinder, and of causing the predetermined oil pressure from the pressure reducing valve to act on the primary hydraulic cylinder when the hydraulic oil supplying/discharging operation is not performed, the hydraulic control device is able to shut off the oil passageway connecting the output port of the pressure reducing valve and the primary hydraulic cylinder. Hence, the size increase or cost increase of the hydraulic circuit caused by, for example, the addition of new devices for shutting off the oil passageway, such as a switch valve, a control valve, etc., is minimized.

Preferably, as for the ordinary shift control of the continuously variable transmission when the vehicle speed is greater than a predetermined vehicle speed, for example, a vehicle speed that allows the rotational speed of a rotating member to be detected by a rotational speed sensor, various fashions of control may be adopted. For example, the ordinary shift control may be executed by a feedback control in which a target speed change ratio is found in accordance with a predetermined shift condition, and the groove width of the primary pulley is altered by adjusting the amount of hydraulic oil supplied to or discharged from the primary hydraulic cylinder through the use of the shift control valve so that the actual speed change ratio reaches the target speed change ratio, or the ordinary shift control may also be executed by a feedback control in which a target rotational speed of the input side (drive source side) is found in accordance with the vehicle speed, the output rotational speed (driving wheel-side rotational speed), etc., and the groove width of the primary pulley is altered by adjusting the amount of hydraulic oil supplied to or discharged from the primary hydraulic oil through the use of the shift control valve so that the actual input rotational speed reaches the target rotational speed, or the like.

The aforementioned predetermined shift condition is set, for example, through the use of a map, a computational expression or the like in which parameters are states of operation of the vehicle, including the driver's requested output amount (requested acceleration amount), such as the accelerator operation amount or the like, as well as the vehicle speed (corresponding to the output rotational speed), or the like.

Furthermore, the shift control when the aforementioned feedback control is difficult, such as when the vehicle is traveling at a very low speed, which is below a predetermined vehicle speed, may be executed, for example, by a closing-in control in which the hydraulic oil supplying/discharging operation by the shift control with respect to the primary hydraulic cylinder is not performed, but a predetermined oil pressure is caused to act on the primary hydraulic cylinder through the use of the pressure reducing valve so that the speed change ratio of the continuously variable transmission is caused to reach a predetermined speed change ratio and, simultaneously a state in which the hydraulic oil is confined in the primary hydraulic cylinder is formed, and while this state is maintained, the ratio between the oil pressure in the primary hydraulic cylinder and the oil pressure in the secondary hydraulic cylinder is caused to be in a predetermined relationship. More concretely, the pressure reducing valve is constructed so that the oil pressure of the secondary hydraulic cylinder is introduced thereinto as a pilot pressure and the pressure reducing valve outputs a predetermined oil pressure. The predetermined oil pressure acts on the primary hydraulic cylinder, so that a predetermined thrust ratio (=(the oil pressure of the secondary hydraulic cylinder×the pressure reception area of the secondary hydraulic cylinder)/(the oil pressure on the primary hydraulic cylinder×the pressure reception area of the primary hydraulic cylinder)) is achieved.

The vehicle power source may be, for example, a widely used internal combustion engine, such as a gasoline engine, a diesel engine, etc. In addition to the aforementioned engine, an electric motor or the like may be used as an auxiliary vehicle power source. Alternatively, an electric motor may be used as the sole vehicle power source.

A second aspect of the present invention relates to a shift control method of a vehicular continuously variable transmission. The shift control method includes the steps of: determining whether an amount of hydraulic oil supplied to or discharged from a primary hydraulic cylinder is adjusted in order to shift a continuously variable transmission that includes the primary hydraulic cylinder that alters a groove width of a primary pulley; and a secondary hydraulic cylinder that alters the groove width of a secondary pulley; determining whether a predetermined oil pressure to act on the primary hydraulic cylinder is caused so that a ratio between an oil pressure in the primary hydraulic cylinder and the oil pressure in the secondary hydraulic cylinder is caused to be in a predetermined relationship; and executing a control so that the ration is not caused to be in a predetermined relationship even when the shift control valve is not supplying/discharging the hydraulic oil, when it is determined that a predetermined condition is met.

It may be determined that the predetermined condition is met, when an actual input shaft speed of the continuously variable transmission becomes a target input shaft speed. Furthermore, the predetermined oil pressure may be acted on the primary hydraulic cylinder so that the ratio between the oil pressure in the primary hydraulic cylinder and the oil pressure in the secondary hydraulic cylinder is caused to be in the predetermined relationship, when it is determined that a vehicle speed is below a predetermined vehicle speed.

In the second aspect, the predetermined relationship may be such that a speed change ratio of the continuously variable transmission is caused to be a maximum speed change ratio.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 2 is a block diagram illustrating portions of a control system provided in a vehicle for controlling the vehicular driving device shown in FIG. 1, and the like;

DETAILED DESCRIPTION OF THE EMBODIMENTS

Embodiments of the invention will be described hereinafter with reference to the drawings.

Figure 1:
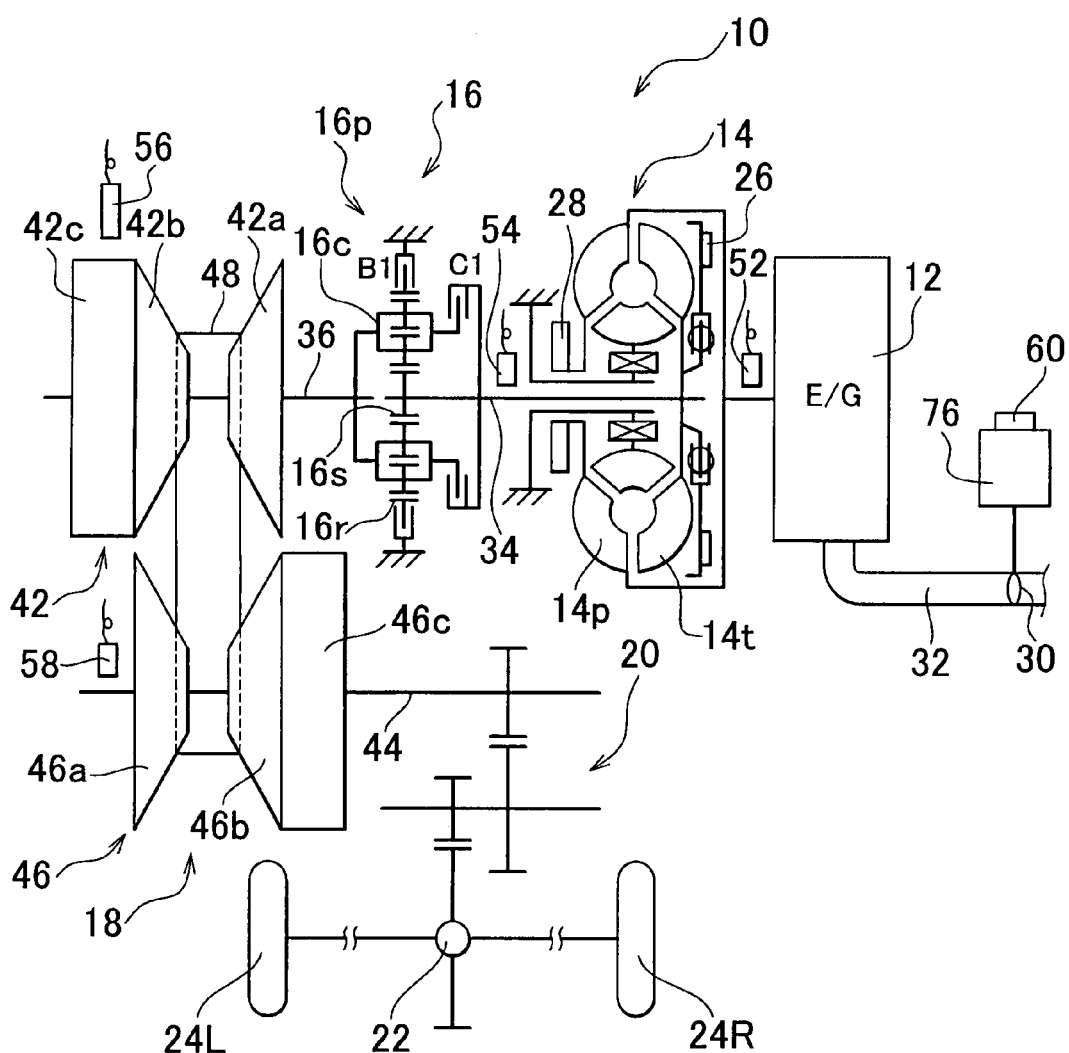
FIG. 1 is a skeleton diagram illustrating a vehicular driving device an embodiment of the invention.

FIG. 1 is a skeleton diagram illustrating the construction of a vehicular driving device 10 to which the invention is applied. The vehicular driving device 10 is a transversely mounted automatic transmission that is suitably adopted in FF (front engine, front wheel drive) type vehicles, and has an engine 12 as a vehicle power source. The output of the engine 12 constructed of an internal combustion engine is transmitted from the crankshaft of the engine 12 through a torque converter 14 as a fluid type transmission device, a forward/reverse travel switch device 16, a belt type continuously variable transmission (CVT) 18, and a speed reduction gear device 20 to a differential gear device 22, and then is distributed to left and right driving wheels 24L, 24R.

The torque converter 14 includes a pump impeller 14p linked to the crankshaft of the engine 12, and a turbine impeller 14t linked to the forward/reverse travel switch device 16 via a turbine shaft 34 that corresponds to an output member of the torque converter 14, and is designed so as to transmit power via fluid. A lockup clutch 26 is provided between the pump impeller 14p and the turbine impeller 14t of the torque converter 14. The lockup clutch 26 is engaged or released as the supply of oil pressure to an engagement oil chamber and a release oil chamber is switched by a lockup control valve (L/C control valve) (not shown) provided in a hydraulic control circuit 100 (see FIGS. 2 and 3). When the lockup clutch 26 is completely engaged, the pump impeller 14p and the turbine impeller 14t rotate integrally as one unit. A mechanical oil pump 28 is linked to the pump impeller 14p. The oil pump 28 generates the oil pressure for the shift control of the continuously variable transmission 18, or producing the belt clamping pressure, or performing the engagement/release control of the lockup clutch 26, or supplying lubricating oil to various portions, as the oil pump 28 is rotationally driven by the engine 12.

The forward/reverse travel switch device 16 is constructed mainly of a forward-travel clutch C1, a reverse-travel brake B1, and a double-pinion type planetary gear device 16p. The turbine shaft 34 of the torque converter 14 is integrally linked to a sun gear 16s, and an input shaft 36 of the continuously variable transmission 18 is integrally linked to a carrier 16c. The carrier 16c and the sun gear 16s are selectively linked to each other via the forward-travel clutch C1. A ring gear 16r is selectively fixed to a housing via the reverse-travel brake B1. The forward-travel clutch C1 and the reverse-travel brake B1 correspond to a connection/disconnection device and are each a hydraulic type friction engagement device that is put into friction engagement by a hydraulic cylinder.

When the forward-travel clutch C1 is engaged and the reverse-travel brake B1 is released, the forward/reverse travel switch device 16 is made rotatable as one unit, that is, the turbine shaft 34 is directly linked to the input shaft 36 of the continuously variable transmission 18. Thus, a forward-travel power transmission path is established (achieved), so that the drive force in the forward travel direction is transmitted to the continuously variable transmission 18. When the reverse-travel brake B1 is engaged and the forward-travel clutch C1 is released, a reverse-travel power transmission path is established (achieved) in the forward/reverse travel switch device 16, so that the input shaft 36 of the continuously variable transmission 18 is rotated in a direction opposite to the rotational direction of the turbine shaft 34. Thus, the drive force in the reverse travel direction is transmitted to the continuously variable transmission 18. Furthermore, when the forward-travel clutch C1 and the reverse-travel brake B1 are both released, the forward/reverse travel switch device 16 assumes a neutral state (power transmission disconnected state) in which the power transmission is disconnected.

The continuously variable transmission 18 includes a driving-side pulley (primary pulley) 42 which is an input member provided on the input shaft 36 and whose effective diameter is variable, a driven-side pulley (secondary pulley) 46 which is an output member provided on an output shaft 44 and whose effective diameter is variable, and a drive belt 48 wrapped around the two variable diameter pulleys 42, 46. Power transmission is carried out by the friction between the variable diameter pulleys 42, 46 and the drive belt 48.

Each of the variable diameter pulleys 42 and 46 is constructed of a stationary rotor 42a, 46a fixed to a corresponding one of the input shaft 36 and the output shaft 44, a movable rotor 42b, 46b provided so as to be incapable of being relatively rotated around the input shaft 36 or the output shaft 44 and movable in the direction of the axis of the input or output shaft, and a corresponding one of a driving-side hydraulic cylinder (primary hydraulic cylinder) 42c and a driven-side hydraulic cylinder (secondary hydraulic cylinder) 46c provided as a hydraulic actuator for applying thrust for changing the width of a V-shape groove between the stationary and movable rotors. As the amount of supply/discharge flow of hydraulic oil with respect to the primary hydraulic cylinder 42c is controlled by the hydraulic control circuit 100, the V-shape groove widths of the two variable diameter pulleys 42, 46 change, altering the pulley contact diameters (effective diameters) of the drive belt 48. Thus, the speed change ratio γ (=input shaft rotational speed $N_{IN}$/output shaft rotational speed $N_{OUT}$) is continuously changed. Furthermore, as a pressure-regulating control of a secondary pressure (hereinafter, referred to as "belt clamping pressure") $P_{OUT}$, which is the oil pressure of the secondary hydraulic cylinder 46c, is performed by the hydraulic control circuit 100, the belt clamping pressure force is controlled so that the drive belt 48 does not slip. As a result of these controls, a primary pressure (hereinafter, referred to as "speed shift control pressure") $P_{IN}$, which is the oil pressure of the primary hydraulic cylinder 42c is produced.

Figure 2:
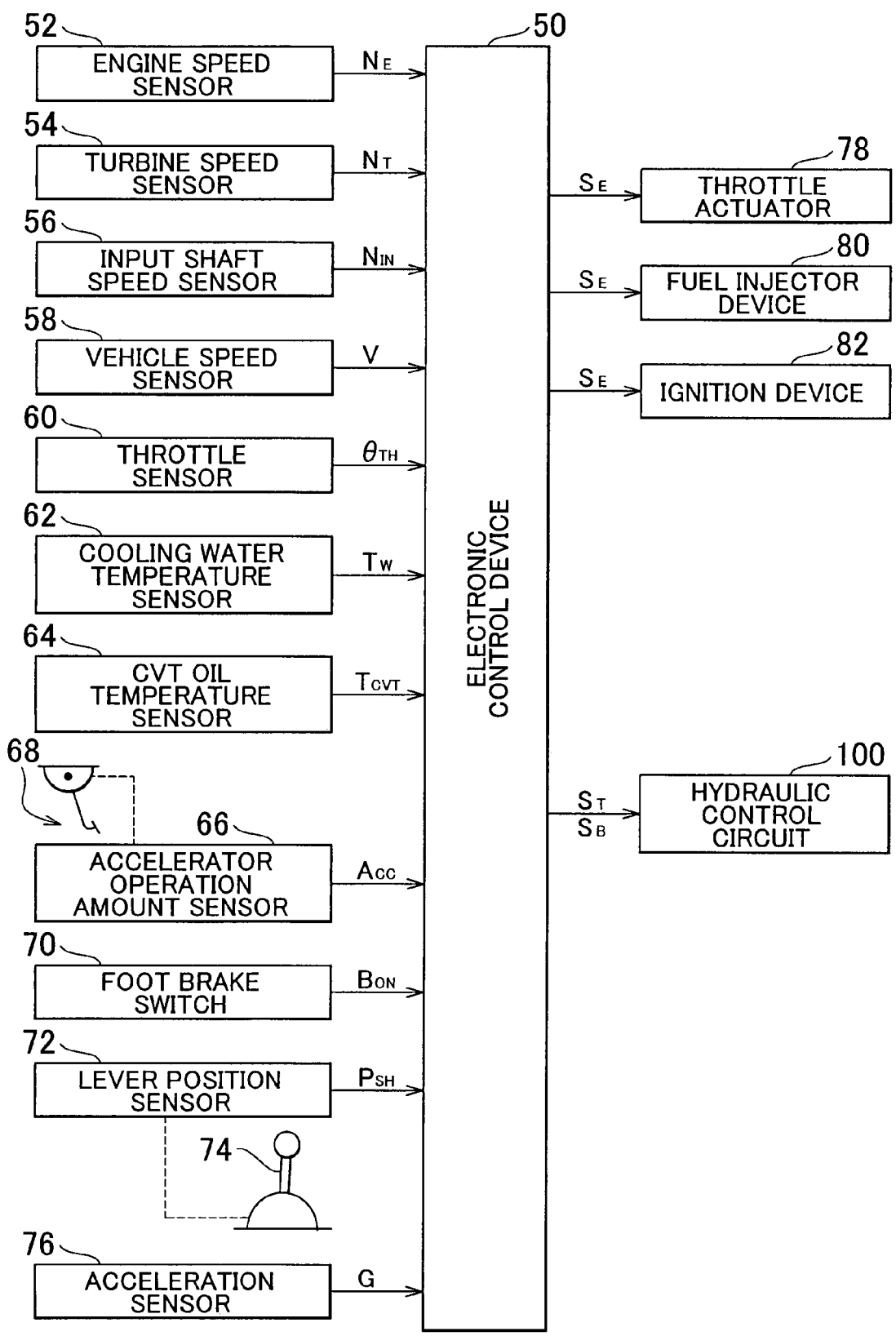

FIG. 2 is a block diagram that illustrates portions of a control system provided in a vehicle to control the vehicular driving device 10 shown in FIG. 1, and the like. The electronic control device 50 includes, for example, a so-called microcomputer that has a CPU, a RAM, a ROM, an input/output interface, etc. The CPU performs signal processing in accordance with programs stored in the ROM and utilizes the temporary storage function of the RAM to execute an output control of the engine 12, the shift control of the continuously variable transmission 18, the belt clamping force control, a torque capacity control of the lockup clutch 26, etc. Alternatively, separate electronic control devices may be provided for each of the engine control, the hydraulic control of the continuously variable transmission 18 and the lockup clutch 26, etc., as needed.

The electronic control device 50 is supplied with a signal that indicates the crankshaft rotational speed that corresponds to the crankshaft rotation angle (position) $A_{CR}$ (°) detected by an engine speed sensor 52 and to the rotational speed of the engine 12 (engine speed) $N_E$; a signal that indicates the rotational speed of the turbine shaft 34 (turbine speed) $N_T$ detected by a turbine rotation speed sensor 54; a signal that indicates the rotational speed of the input shaft 36 (input shaft speed) $N_{IN}$ that is the input rotational speed of the continuously variable transmission 18 detected by an input shaft speed sensor 56; a vehicle speed signal that indicates the vehicle speed V that corresponds to the rotational speed of the output shaft 44 (output shaft speed) $N_{OUT}$, which is the output rotational speed of the continuously variable transmission 18 detected by a vehicle speed sensor (output shaft speed sensor) 58; a throttle valve opening degree signal that indicates the throttle valve opening degree $\theta_{TH}$ of an electronic throttle valve 30 provided in an intake pipe 32 (see FIG. 1) of the engine 12, which is detected by a throttle sensor 60; a signal that indicates the coolant temperature $T_W$ of the engine 12 detected by a coolant temperature sensor 62; a signal that indicates the oil temperature $T_{CVT}$ of the hydraulic circuit of the continuously variable transmission 18 or the like, which is detected by a CVT oil temperature sensor 64; an accelerator operation amount signal that indicates the accelerator operation amount Acc, that is, the amount of operation of an accelerator pedal 68, which is detected by an accelerator operation amount sensor 66; a brake operation signal that indicates the presence/absence of operation $B_{ON}$ of a foot brake, that is, a service brake, which is detected by a foot brake switch 70; an operation position signal that indicates the lever position (operation position) $P_{SH}$ of a shift lever 74 detected by a lever position sensor 72; a signal that indicates the acceleration G of the vehicle in the longitudinal direction thereof, which is detected by an acceleration sensor 76, etc.

The electronic control device 50 outputs engine control command signals $S_E$ to control the output of the engine 12, for example, a throttle signal for driving a throttle actuator 78 to control the opening/closing of the electronic throttle valve 30; an ignition signal to control the amount of fuel injected from a fuel injection device 80; an ignition timing signal to control the timing of the ignition of the engine 12 performed by an ignition device 82, etc. Still further, the electronic control device 50 outputs to the hydraulic control circuit 100 various signals, including: shift control command signals $S_T$ to change the speed change ratio γ of the continuously variable transmission 18, for example, a command signal to drive a solenoid valve DS1 and a solenoid valve DS2 that control the amount of flow of hydraulic oil to the primary hydraulic cylinder 42c; clamping pressure force control command signals $S_B$ to regulate the clamping pressure force of the drive belt 48, for example, a command signal to drive a linear solenoid valve SLS that regulates the belt clamping pressure $P_{OUT}$, a command signal to drive a linear solenoid valve SLT that regulates the line oil pressure $P_L$; etc.

The shift lever 74 is disposed, for example, near the driver's seat, and may be manually operated to any one of the five lever positions "P", "R", "N", "D" and "L" (see FIG. 3) that are sequentially located.

The "P" position is a parking position for opening the power transmission path in the vehicular driving device 10, that is, for bringing about a neutral state where the power transmission in the vehicular driving device 10 is disconnected, and for mechanically stopping (locking) rotation of the output shaft 44 via a mechanical parking mechanism. The "R" position is a reverse run position for reversing the rotational direction of the output shaft 44 of the vehicular driving device 10. The "N" position is a neutral position for bringing about the neutral state where the power transmission in the vehicular driving device 10 is disconnected. The "D" position is a forward run position for causing the execution of an automatic shift control by establishing an automatic shift mode in a shift range in which the shift of the continuously variable transmission 18 is permissible. The "L" position is an engine brake position for causing a strong engine brake effect. Thus, the "P" position and the "N" position are non-run positions that are selected when the vehicle is not moving. On the other hand, the "R" position, the "N" position and the "L" position are vehicle-run positions that are selected when the vehicle is moving.

Figure 3:
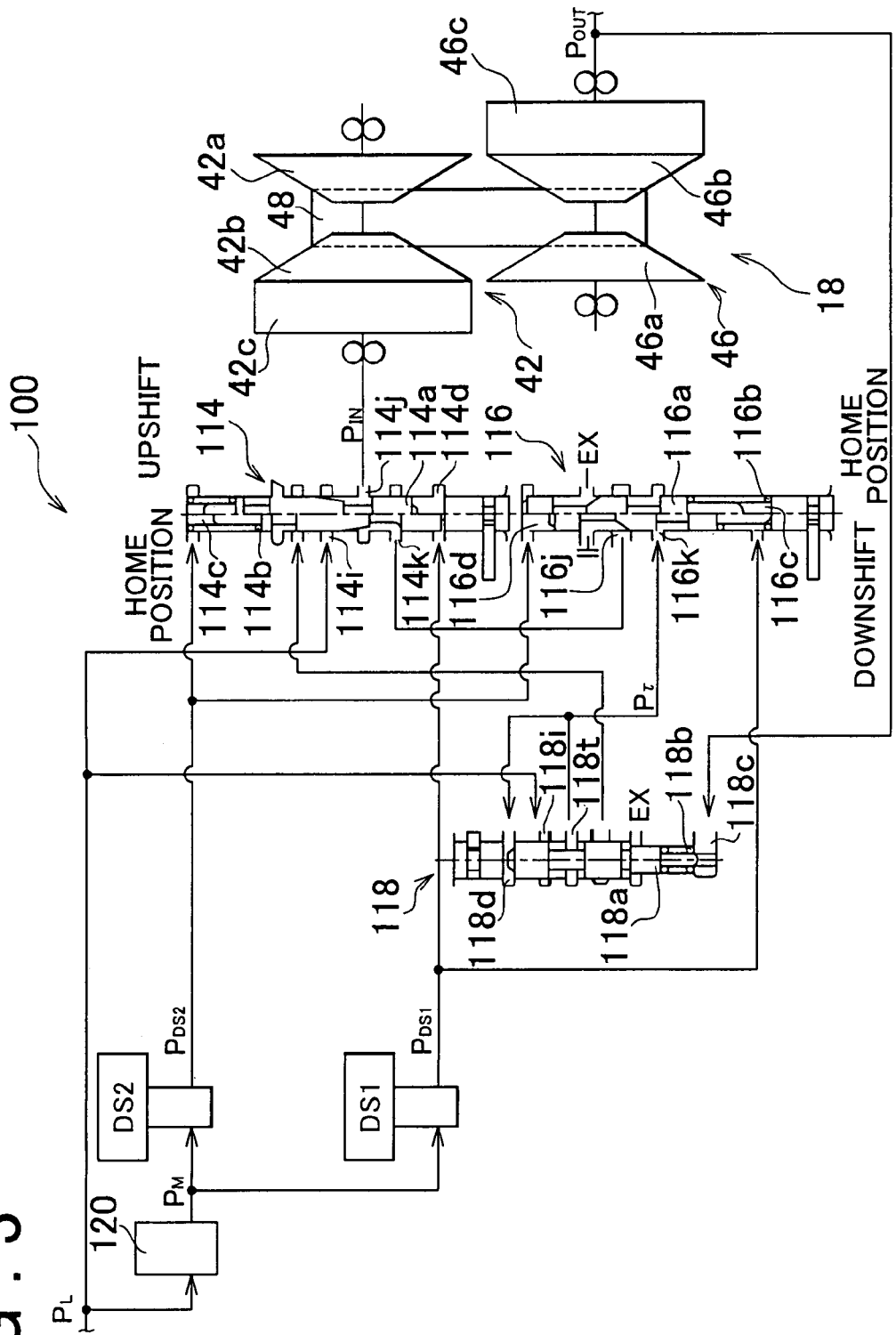
FIG. 3 is a hydraulic circuit diagram showing portions of a hydraulic control circuit, which are relevant to a speed change ratio control of a continuously variable transmission.

FIG. 3 is a hydraulic circuit diagram showing portions of the hydraulic control circuit 100 that are relevant to a speed change ratio control of the continuously variable transmission 18. In FIG. 3, the hydraulic control circuit 100 includes shift control valves that adjust the amount of hydraulic oil supplied to and discharged from the primary hydraulic cylinder 42c in order to shift the continuously variable transmission 18, that is a speed change ratio control valve UP 114 and a speed change ratio control valve DN 116 that control the amount of flow of hydraulic oil to the primary hydraulic cylinder 42c so that the speed change ratio γ is continuously changed, a thrust ratio control valve 118 provided as a pressure reducing valve which causes the ratio between the shift pressure $P_{IN}$ and the belt clamping pressure $P_{OUT}$ to be in a predetermined relationship by causing a thrust ratio control oil pressure Pπ as a predetermined oil pressure to act on the primary hydraulic cylinder 42c when the hydraulic oil supplying/discharging operation by the speed change ratio control valve UP 114 and the speed change ratio control valve DN 116 is not performed, etc. Furthermore, although not shown in the drawings, the hydraulic control circuit 100 also includes a clamping pressure control valve that regulates a belt clamping pressure $P_{OUT}$, which is the oil pressure of the secondary hydraulic cylinder 46c, based on a control oil pressure $P_{SLS}$, which is the output oil pressure of the linear solenoid valve SLS, so that the drive belt 48 does not slip; and a manual valve whose oil passageway is mechanically switched in accordance with the operation of the shift lever 74 so that the forward-travel clutch C1 and the reverse-travel brake B1 are engaged or released, etc.

The line oil pressure $P_L$ is regulated to a value that is in accordance with the engine load and the like, for example, on the basis of a control oil pressure $P_{SLT}$ that is the output oil pressure of the linear solenoid valve SLT, by a relief type primary regulator valve (line oil pressure regulating valve), through the use as a basic pressure of the hydraulic oil pressure output (generated) from the mechanical oil pump 28 that is rotationally driven by the engine 12. A modulator oil pressure $P_M$ is used as the basic pressure of the control oil pressure $P_{SLT}$ and of a control oil pressure $P_{SLS}$. The modulator oil pressure $P_M$ is used also as the basic pressure of a control oil pressure $P_{DS1}$, which is the output oil pressure of the solenoid valve DS1, and of a control oil pressure $P_{DS2}$, which is the output oil pressure of the solenoid valve DS2. The solenoid valve DS1 and the solenoid valve DS2 are duty-controlled by the electronic control device 50. The modulator oil pressure $P_M$ is regulated to a constant pressure by a modulator valve 120 through the use of the line oil pressure $P_L$ as the basic pressure.

The speed change ratio control valve UP 114 includes a spool valve element 114a that is provided movably in the direction of the axis to be positioned at an upshift position where the line oil pressure $P_L$ may be received via an input port 114i and supplied to the primary pulley 42 through an input/output port 114j and where an input/output port 114k is closed, and at a home position where the input port 114i is closed and where the primary pulley 42 is connected in communication with the input/output port 114k via the input/output port 114j, a spring 114b provided as urging means for urging the spool valve element 114a toward the home position side, an oil chamber 114c that contains the spring 114b and that receives the control oil pressure $P_{DS2}$ in order to apply to the spool valve element 114a thrust toward the home position side, and an oil chamber 114d that receives the control oil pressure $P_{DS1}$ in order to apply to the spool valve element 114a thrust toward the upshift position side.

The speed change ratio control valve DN 116 includes a spool valve element 116a that is provided movably in the axial direction so as to be positioned at a downshift position, where an input/output port 116j is communicably connected to the discharge port EX and where the input/output port 116j is disconnected from an input/output port 116k, and at a home position, where the input/output port 116j is communicably connected with the input/output port 116k and where the input/output port 116j is disconnected from the discharge port EX; a spring 116b provided as an impelling means for impelling the spool valve element 116a toward the home position; an oil chamber 116c that contains the spring 116b and that receives the control oil pressure $P_{DS1}$ in order to apply to a spool valve element 116a thrust toward the home position; and an oil chamber 116d that receives the control oil pressure $P_{DS2}$ in order to apply to the spool valve element 116a thrust toward the downshift position.

In the speed change ratio control valve UP 114 and the speed change ratio control valve DN 116 constructed as described above, during a closed state where the spool valve element 114a is held at the home position as shown by the illustration of a half portion on the left of a center line thereof shown in FIG. 3, in accordance with the spring force of the spring 114b, the input/output port 114i and the input/output port 114j are disconnected in communication and the input/output port 114j and the input/output port 114k are connected in communication to allow the hydraulic oil from the primary pulley 42 (primary hydraulic cylinder 42c) to flow to the input/output port 116j. Furthermore, during a closed state where the spool valve element 116a is held at the home position in accordance with the spring force of the spring 116b as shown by the illustration of a half portion on the right side of the center line in FIG. 3, the input/output port 116j and the discharge port EX are disconnected in communication and the input/output port 116j and the input/output port 116k are connected in communication to allow a thrust ratio control oil pressure Pτ to pass from the thrust ratio control valve 118 to the input/output port 114k. Therefore, the thrust ratio control oil pressure Pτ from the thrust ratio control valve 118 is caused to act on the primary hydraulic cylinder 42c.

When the control oil pressure $P_{DS1}$ is supplied to the oil chamber 114d, the spool valve element 114a is moved to the upshift position against the spring force of the spring 114b as shown by the illustration of the half on the right side of the center line, by the thrust that is in accordance with the control oil pressure $P_{DS1}$. The line oil pressure $P_L$ is supplied in an amount of flow corresponding to the control oil pressure $P_{DS1}$ from the input port 114i via the input/output port 114j to the primary hydraulic cylinder 42c. At the same time, the input/output port 114k is disconnected to stop the passage of the hydraulic oil to the speed change ratio control valve DN 116 side. Therefore, the shift pressure $P_{IN}$ is increased, which reduces the width of the V groove of the primary pulley 42 thereby reducing the speed change ratio γ, that is, the continuously variable transmission 18 is upshifted.

When the control oil pressure $P_{DS2}$ is supplied to the oil chamber 116d, the spool valve element 116a is moved to the downshift position against the spring force of the spring 116b as shown by the illustration of the half on the left side of the center line, by the thrust that is in accordance with the control oil pressure $P_{DS2}$. Therefore, the hydraulic oil in the primary hydraulic cylinder 42c is discharged in an amount corresponding to the control oil pressure $P_{DS2}$, from the discharge port EX via the input/output port 114j, the input/output port 114k and then the input/output port 116j. At the same time, the input/output port 116j and the input/output port 116k are disconnected in communication to stop the passage of the thrust ratio control oil pressure Pτ from the thrust ratio control valve 118 into the input/output port 114k. Due to this, the shift pressure $P_{IN}$ is lowered, so that the width of the V-shape groove of the primary pulley 42 increases and the speed change ratio γ is increased, that is, the continuously variable transmission 18 is downshifted.

Thus, the line oil pressure $P_L$ is used as the basic pressure of the shift pressure $P_{IN}$. When the control oil pressure $P_{DS1}$ is output, the line oil pressure $P_L$ input to the speed change ratio control valve UP 114 is supplied to the primary hydraulic cylinder 42c so that the shift pressure $P_{IN}$ is increased causing a continuous upshift. When the control oil pressure $P_{DS2}$ is output, the hydraulic oil of the primary hydraulic cylinder 42c is discharged from the discharge port EX, so that the shift pressure $P_{IN}$ is lowered causing a continuous downshift.

Figure 4:
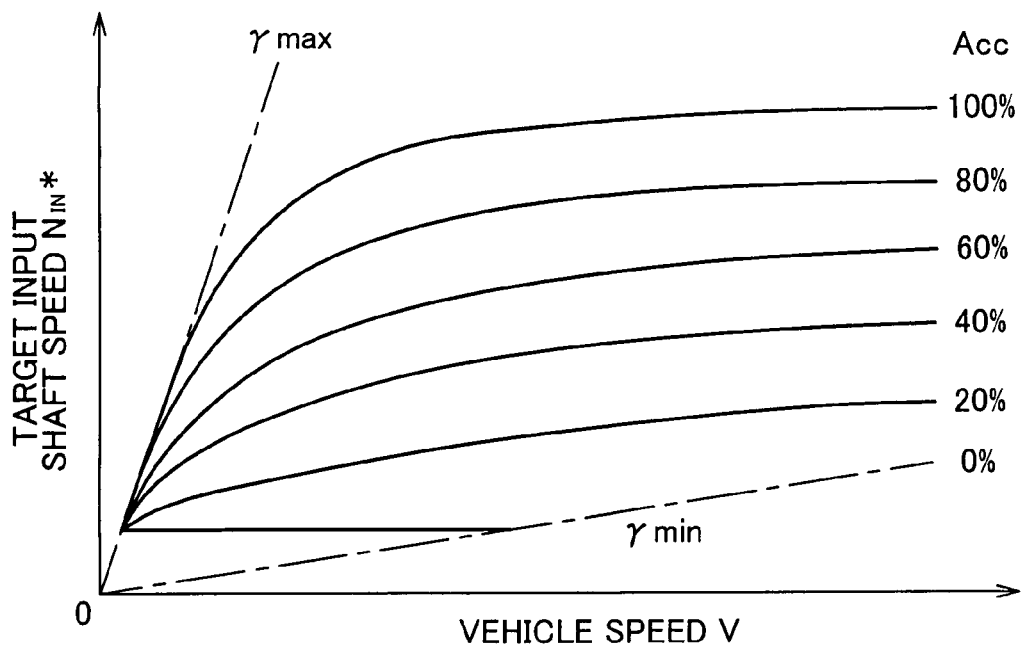
FIG. 4 is a diagram showing an example of a shift map used to find a target input rotational speed in the shift control of the continuously variable transmission.

For example, using a pre-stored relationship (shift map) between the vehicle speed V and the target input shaft rotational speed $N_{IN}^*$ that is the target input rotational speed of the continuously variable transmission 18 with the accelerator operation amount Acc being a parameter as shown in FIG. 4, a target input shaft speed $N_{IN}^*$ is set on the basis of a vehicle state represented by the actual vehicle speed V and the actual accelerator operation amount Acc. Then, the shifting of the continuously variable transmission 18 is performed through a feedback control by the electronic control device 50, which functions as a shift control device equipped with the hydraulic control circuit 100, in such a fashion that the target input shaft speed $N_{IN}^*$ and the actual input shaft speed $N_{IN}$ become equal. Specifically, the hydraulic oil is supplied to or discharged from the primary hydraulic cylinder 42c to change the widths of the V-shape groove of the two variable diameter pulleys 42, 46, and thus the speed change ratio γ is continuously changed by the feedback control.

The shift map of FIG. 4 corresponds to a shift condition, and is formed so as to set such a target input shaft speed $N_{IN}^*$ as to provide the larger speed change ratio γ the smaller the vehicle speed V is and the larger the accelerator operation amount Acc is. Furthermore, since the vehicle speed V corresponds to the output shaft speed $N_{OUT}$, the target input shaft speed $N_{IN}^*$, which is the target value of the input shaft speed $N_{IN}$, corresponds to the target speed change ratio $\gamma^* (=N_{IN}^*/N_{OUT})$ that is set within the range between a minimum speed change ratio γmin and a maximum speed change ratio γmax.

Furthermore, the control oil pressure $P_{DS1}$ is supplied to the oil chamber 116c of the speed change ratio control valve DN 116 to put the speed change ratio control valve DN 116 into the closed state to restrict the downshift regardless of the control oil pressure $P_{DS2}$. On the other hand, the control oil pressure $P_{DS2}$ is supplied to the oil chamber 114c of the speed change ratio control valve UP 114 to put the speed change ratio control valve UP 114 into the closed state to prohibit the upshift regardless of the control oil pressure $P_{DS1}$. That is, not only when the control oil pressure $P_{DS1}$ and the control oil pressure $P_{DS2}$ are not supplied, but also when the control oil pressure $P_{DS1}$ and the control oil pressure $P_{DS2}$ are both supplied, each of the speed change ratio control valve UP 114 and the speed change ratio control valve DN 116 is caused to be in the closed state where the spool valve element is held at the home position. Therefore, even at the time of an on-failure in which one of the solenoid valves DS1, DS2 becomes unable to function due to a failure in the electric system or the like, and therefore, the control oil pressure $P_{DS1}$ or the control oil pressure $P_{DS2}$ continues to be output at a maximum pressure, it is possible to prevent the occurrence of a sharp upshift or downshift, and the occurrence of a belt slip caused by such a sharp shift.

In the clamping pressure control valve constructed as described above, the belt clamping pressure $P_{OUT}$ is output by a continuous pressure regulating control of the line oil pressure $P_L$ through the use of the control oil pressure $P_{SLS}$ as a pilot pressure so that the drive belt 48 does not slip.

Figure 5:
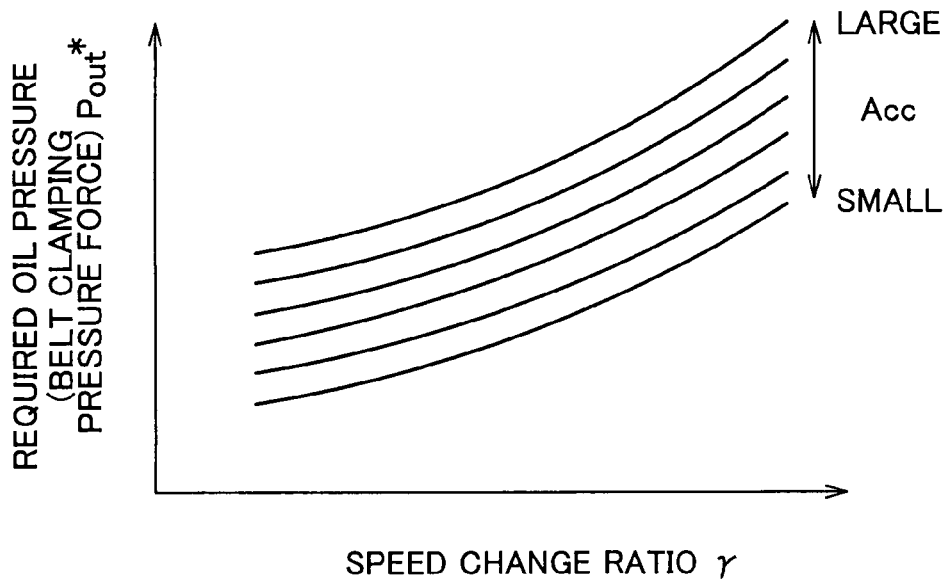
FIG. 5 is a diagram showing an example of a belt clamping pressure force map to find a required oil pressure in accordance with the speed change ratio or the like in a clamping pressure force control of the continuously variable transmission.

For example, as shown in FIG. 5, using a pre-stored relationship (belt clamping pressure force map) between the speed change ratio γ and the required oil pressure (belt clamping pressure force) $P_{OUT}^*$ with the transmission torque-corresponding accelerator operation amount Acc (or the throttle valve opening degree $\theta_{TH}$, the input torque to the continuously variable transmission 18, etc.) being a parameter which relationship has been experimentally found so as not to allow the slipping of the belt, a belt clamping pressure force $P_{OUT}^*$ is determined (calculated) on the basis of a state of the vehicle indicated by the actual speed change ratio γ and the accelerator operation amount Acc. Then, the belt clamping pressure $P_{OUT}$ of the secondary hydraulic cylinder 46c is controlled so that the calculated belt clamping pressure force $P_{OUT}^*$ is obtained. In accordance with this belt clamping pressure $P_{OUT}$, the belt clamping pressure force $P_{OUT}^*$, that is, the friction force between the variable diameter pulleys 42, 46 and the drive belt 48, is increased and decreased.

The thrust ratio control valve 118 includes a spool valve element 118a, provided movably in the direction of the axis to open and close an input port 118i, so that the line oil pressure $P_L$ may be supplied via the input port 118i, and an output port 118t, to the speed change ratio control valve DN 116, and thus the thrust ratio control oil pressure Pτ may be supplied thereto; a spring 118b provided to impel the spool valve element 118a in the valve opening direction; an oil chamber 118c that contains the spring 118b and that receives the belt clamping pressure $P_{OUT}$ in order to apply to the spool valve element 118a thrust in the valve opening direction; and a feedback oil chamber 118d that receives the thrust ratio control oil pressure Pτ output from the output port 118t in order to apply to the spool valve element 118a thrust in the valve closing direction.

In the thrust ratio control valve 118 constructed as described above, an equilibrium state is expressed by the following expression (1):

$$P_\tau \times b = Pd \times a + F_S \quad (1)$$

where a is the pressure reception area for the belt clamping pressure $P_{OUT}$ in the oil chamber 118c, and b is the pressure reception area for the thrust ratio control oil pressure Pτ in the feedback oil chamber 118d, and Fs is the spring force of the spring 118b. Therefore, the thrust ratio control oil pressure Pτ is expressed by the following expression (2), and is proportional to the belt clamping pressure $P_{OUT}$.

$$P\tau = Pout \times (a/b) + F_S/b \quad (2)$$

When neither the control oil pressure $P_{DS1}$ nor the control oil pressure $P_{DS2}$ is supplied, and when both the control oil pressure $P_{DS1}$ greater than or equal to a predetermined pressure and the control oil pressure $P_{DS2}$ greater than or equal to a predetermined pressure are supplied, each of the speed change ratio control valve UP 114 and the speed change ratio control valve DN 116 is caused to be in the closed state where the spool valve element thereof is held at the home position. In this case, the thrust ratio control oil pressure Pτ is supplied to the primary hydraulic cylinder 42c, so that the shift pressure $P_{IN}$ is made equal to the thrust ratio control oil pressure Pτ. That is, the thrust ratio control valve 118 outputs the thrust ratio control oil pressure Pτ, that is, the shift pressure $P_{IN}$, which keeps the ratio between the shift pressure $P_{IN}$ and the belt clamping pressure $P_{OUT}$ in a predetermined relationship.

For example, the input shaft speed sensor 56 and the vehicle speed sensor 58 are not able to accurately detect the input shaft speed $N_{IN}$ and the vehicle speed V when the vehicle speed is below a predetermined vehicle speed V'. When the vehicle travels at such a low vehicle speed or when launching the vehicle, a so-called closing-in control is executed, in which neither the control oil pressure $P_{DS1}$ nor the control oil pressure $P_{DS2}$ is supplied, instead of the feedback-control of the speed change ratio γ and therefore the speed change ratio control valve UP 114 and the speed change ratio control valve DN 116 are closed. When the vehicle travels at low-speed or when the vehicle is launched, shift pressure $P_{IN}$ that is proportional to the belt clamping pressure $P_{OUT}$ is supplied to the primary hydraulic cylinder 42c so that the ratio between the shift pressure $P_{IN}$ and the belt clamping pressure $P_{OUT}$ is in a predetermined relationship. Thus, the slipping of the drive belt 48 when the vehicle is stopped or traveling at very low vehicle speeds is prevented. Furthermore, for example, if (a/b) in the first term on the right side in the expression (2) and $F_S/b$ therein are set to allow the realization of a thrust ratio π that is greater than the thrust ratio τ (=secondary hydraulic cylinder thrust $W_{OUT}$/primary hydraulic cylinder thrust $W_{IN}$, where $W_{OUT}$ is the belt clamping pressure $P_{OUT}$ times the pressure reception area of the secondary hydraulic cylinder 46c, and $W_{IN}$ is the shift pressure $P_{IN}$ times the pressure reception area of the primary hydraulic cylinder 42c) that corresponds to the maximum speed change ratio γmax, the vehicle may be smoothly launched with the maximum speed change ratio γmax or a speed change ratio γmax' in the vicinity thereof. Furthermore, the predetermined vehicle speed V' is set to a vehicle speed V at which the rotational speed of a predetermined rotating member, for example, the input shaft speed $N_{IN}$, becomes so small as to be undetectable, and which allows the execution of a predetermined feedback control. For example, the predetermined vehicle speed is set at about 2 km/h.

Figure 6:
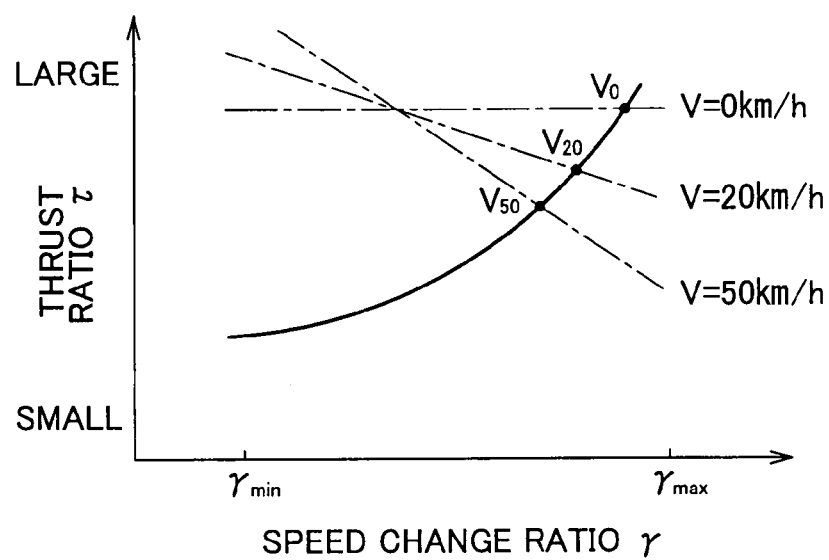
FIG. 6 shows a pre-found and stored relationship between the speed change ratio and the thrust ratio with the vehicle speed being a parameter.

FIG. 6 is a diagram showing a predetermined and stored relationship between the speed change ratio γ and the thrust ratio τ with the vehicle speed V being a parameter, and also showing an example case where the first term (a/b) on the right side of the expression (2) is set so as to achieve the relationship shown. The parameter of the vehicle speed V shown by one-dot chain lines is the thrust ratio τ that is calculated by factoring in the centrifugal oil pressure in the primary hydraulic cylinder 42c and the secondary hydraulic cylinder 46c. At the point ($V_0$, $V_{20}$, $V_{50}$) of intersection with a solid line shown in the diagram, a speed change ratio γ is found as a predetermined speed change ratio that is maintained during the closing-in control. For example, in the continuously variable transmission 18 of the embodiment as shown in FIG. 6, a maximum speed change ratio γmax may be held as a predetermined speed change ratio at the time of the closing-in control when the vehicle speed V is 0 km/h, that is, when the vehicle is stopped.

Incidentally, when the continuously variable transmission 18 is shifted by the feedback control, as the actual input shaft speed $N_{IN}$ approaches the target input shaft speed $N_{IN}*$, the amount of the hydraulic oil supplied to or discharged from the primary hydraulic cylinder 42c by the speed change ratio control valve UP 114 and the speed change ratio control valve DN 116 is reduced until eventually the speed change ratio control valve UP 114 and the speed change ratio control valve DN 116 stop supplying the hydraulic oil. This state is the same as the state where the closing-in control is being executed, in that the hydraulic oil supplying/discharging operation is not performed. However, if the thrust ratio control oil pressure Pτ from the thrust ratio control valve 118 is caused to act on the primary hydraulic cylinder 42c as in the closing-in control when the hydraulic oil supplying/discharging operation ceases to be performed during a shift, it may result in a sharp upshift or a sharp downshift, which impairs the continuity of control of the shift.

Therefore, the hydraulic control circuit 100 is constructed in such a fashion that an oil passageway connecting the output port 118t of the thrust ratio control valve 118 and the primary hydraulic cylinder 42c (hereinafter, referred to as "oil passageway A") may be disconnected, so that even when the hydraulic oil supplying/discharging operation by the speed change ratio control valve UP 114 and the speed change ratio control valve DN 116 is not performed, the ratio between the shift pressure $P_{IN}$ and the belt clamping pressure $P_{OUT}$ is not caused to be in a predetermined relationship, that is, the thrust ratio control oil pressure Pτ from the thrust ratio control valve 118 is not caused to act on the primary hydraulic cylinder 42c.

Figure 7:
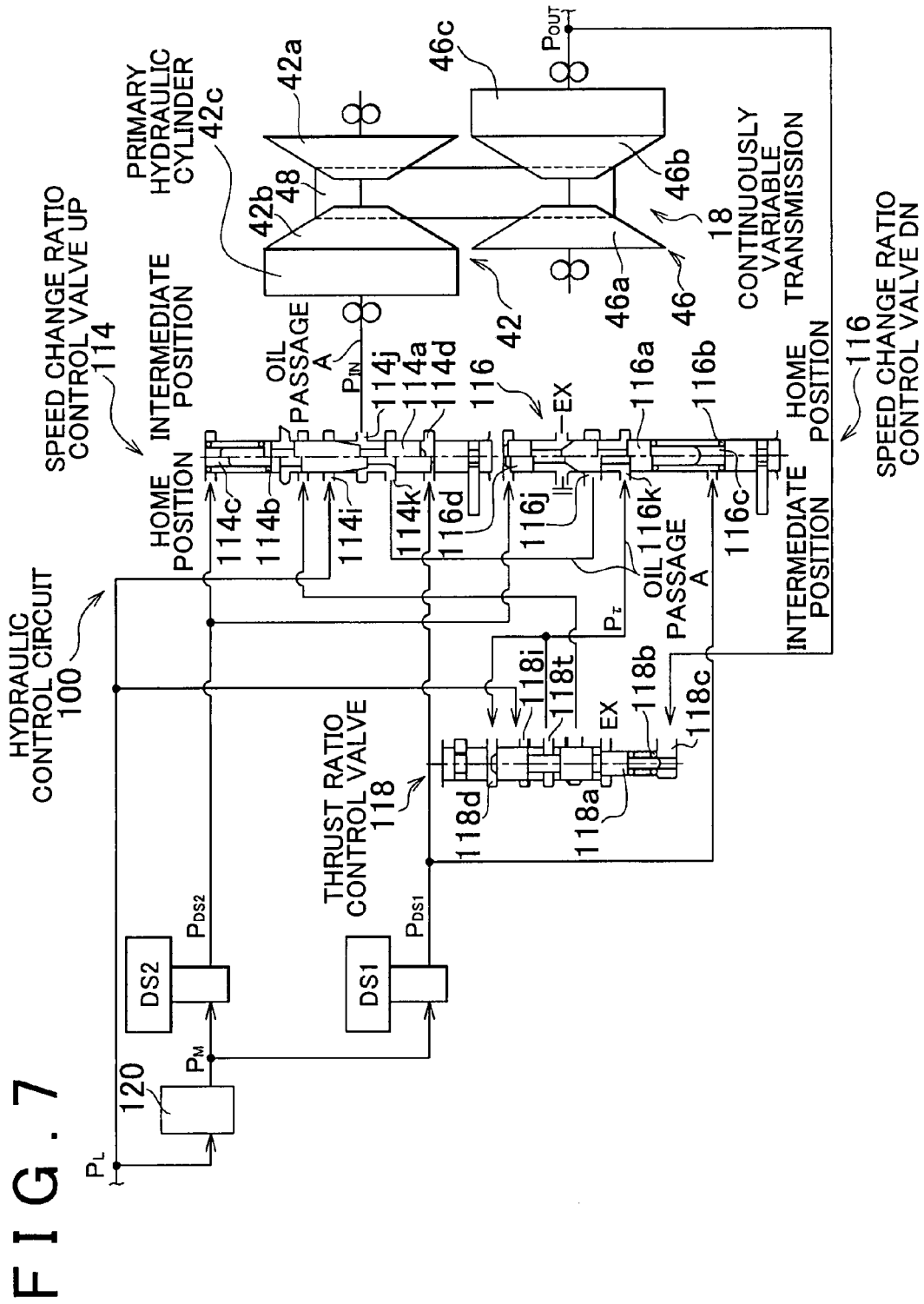
FIG. 7 is a diagram illustrating that in a speed change ratio control valve UP (or a speed change ratio control valve DN) in the hydraulic control circuit shown in FIG. 3, a spool valve element is positioned at an intermediate position in addition to an upshift position (or a downshift position) and a home position.

Concretely, as shown in FIG. 7, the speed change ratio control valve UP 114 is able to position the spool valve element 114a not only at the upshift position and the home position, but also at an intermediate position where the input port 114i is opened and the input/output port 114k is closed. In the speed change ratio control valve UP 114 constructed as described above, if the control oil pressure $P_{DS1}$ supplied to the oil chamber 114d is in a predetermined oil pressure range that causes the spool valve element 114a to be at the intermediate position, the spool valve element 114a is moved from the upshift position to the intermediate position as shown by the half portion on the right of the center line as the thrust in accordance with the control oil pressure $P_{DS1}$ declines. At the intermediate position, the input port 114i and the input/output port 114j are shut off to shut off the supply of the line oil pressure $P_L$ to the primary hydraulic cylinder 42c, and the input/output port 114j and the input/output port 114k are also shut off to shut off the supply of the thrust ratio control oil pressure Pτ to the primary hydraulic cylinder 42c. Therefore, during an upshift, when the supply of the hydraulic oil ceases, the hydraulic oil in the primary hydraulic cylinder 42c is completely closed therein, so that the action of the thrust ratio control oil pressure Pτ on the primary hydraulic cylinder 42c is avoided.

Likewise, the speed change ratio control valve DN 116 is able to position the spool valve element 116a not only at the downshift position and the home position, but also at an intermediate position at which the input/output port 116j is closed. In the speed change ratio control valve DOWN 116 constructed as described above, if the control oil pressure $P_{DS2}$ supplied to the oil chamber 116d is in a predetermined oil pressure range for causing the spool valve element 116a to be at the intermediate position, the spool valve element 116a moves from the downshift position side to the intermediate position as shown by the half portion on the left of the center line as the thrust in accordance with the control oil pressure $P_{DS2}$ declines. At the intermediate position, the input/output port 116j and the discharge portion EX are shut off to shut off the discharge of the hydraulic oil in the primary hydraulic cylinder 42c from the discharge port EX, and the input/output port 116j and the input/output port 116k are also shut off to shut off the supply of the thrust ratio control oil pressure Pτ to the primary hydraulic cylinder 42c. Therefore, during a downshift, when the discharge of the hydraulic oil ceases, the hydraulic oil in the primary hydraulic cylinder 42c is completely closed therein, so that the action of the thrust ratio control oil pressure Pτ on the primary hydraulic cylinder 42c is avoided.

In this manner, the speed change ratio control valve UP 114 and the speed change ratio control valve DN 116 are constructed so as to be selectively switchable among a first state, that is, the upshift position or the downshift position, where the hydraulic oil supplying/discharging operation is performed and the oil passageway A is shut off, a second state, that is, the intermediate position, where the hydraulic oil supplying/discharging operation is not performed and the oil passageway A is shut off, and a third state, that is, the home position, where the hydraulic oil supplying/discharging operation is not performed and the oil passageway A is open. Then, the hydraulic control circuit 100 is constructed so as to be able to shut off the oil passageway A through the use of the speed change ratio control valve UP 114 or the speed change ratio control valve DN 116.

For example, when the vehicle speed V is greater than or equal to a predetermined vehicle speed V', the electronic control device 50 sets a target input shaft speed $N_{IN}*$, for example, from the shift map shown in FIG. 4, on the basis of the actual vehicle speed V and the actual accelerator operation amount Acc, and the continuously variable transmission 18 is shifted by feedback control so that actual input shaft speed $N_{IN}$ becomes equal to the target input shaft speed $N_{IN}*$. That is, the speed change ratio γ is continuously changed by outputting to the hydraulic control circuit 100 a shift control command signal (oil pressure command) $S_T$ that changes the width of the V groove of the two variable diameter pulleys 42, 46 by controlling the amount of flow of the hydraulic oil through the supply and discharge of the hydraulic oil with respect to the primary hydraulic cylinder 42c.

If at the time of this shift, the electronic control device 50 determines that the actual input shaft speed $N_{IN}$ is equal to the target input shaft speed $N_{IN}*$, for example, determines that the rotational speed deviation $\Delta N$ ($=|N_{IN}*-N_{IN}|$) between the actual input shaft speed $N_{IN}$ and the target input shaft speed $N_{IN}*$ is less than or equal to a predetermined rotational speed, the electronic control device 50 outputs to the hydraulic control circuit 100 the shift control command signal $S_T$ that causes the speed change ratio control valve UP 114 to be at the intermediate position if during an upshift, and that causes the speed change ratio control valve DN 116 to be at the intermediate position if during a downshift, so that the hydraulic oil supplying/discharging operation by the speed change ratio control valve UP 114 and the speed change ratio control valve DN 116 is not performed and the supply of the thrust ratio control oil pressure Pτ to the primary hydraulic cylinder 42c is shut off.

The hydraulic control circuit 100, in accordance with the shift control command signal $S_T$, controls the amount of supply/discharge of the hydraulic oil with respect to the primary hydraulic cylinder 42c by operating the solenoid valve DS1 and the solenoid valve DS2 so that the shift of the continuously variable transmission 18 is accordingly executed.

Furthermore, when the vehicle speed V is less than the predetermined vehicle speed V', the electronic control device 50 executes the closing-in control via the thrust ratio control valve 118, instead of performing the feedback control as in an ordinary shift control. That is, the electronic control device 50 establishes a predetermined speed change ratio by outputting to the hydraulic control circuit 100 a shift command (closing-in control command) signal $S_T'$ for a low-vehicle speed-purpose shift control which causes the speed change ratio γ of the continuously variable transmission 18 to be a predetermined speed change ratio, by closing the speed change ratio control valve UP 114 and the speed change ratio control valve DN 116.

The hydraulic control circuit 100, in accordance with the closing-in control command signal $S_T'$, avoids operating the solenoid valve DS1 and the solenoid valve DS2 so as to close the speed change ratio control valve UP 114 and the speed change ratio control valve DN 116, so that the thrust ratio control oil pressure Pτ from the thrust ratio control valve 118 is supplied to the primary hydraulic cylinder 42c.

Thus, according to the embodiment, the hydraulic control circuit 100 is constructed so as to be able to shut off the oil passageway A so that the ratio between the shift pressure $P_{IN}$ and the belt clamping pressure $P_{OUT}$ is not caused to be in a predetermined relationship even if the speed change ratio control valve UP 114 and/or the speed change ratio control valve DN 116 are not supplying/discharging hydraulic oil. Therefore, even if the speed change ratio control valve UP 114 and/or the speed change ratio control valve DN 116 cease supplying/discharging the hydraulic oil, the action of the thrust ratio control oil pressure Pτ output from the thrust ratio control valve 118 on the primary hydraulic cylinder 42c is avoided, so that the impairment of the continuity of the control of the continuously variable transmission 18 is prevented.

Furthermore, according to the embodiment, the hydraulic control circuit 100 is constructed so that the oil passageway A may be shut off by the speed change ratio control valve UP 114 and/or the speed change ratio control valve DN 116. The speed change ratio control valve UP 114 and the speed change ratio control valve DN 116 are constructed so as to be selectively switchable among the first state, that is, the upshift position or the downshift position, where the hydraulic oil supplying/discharging operation is performed and the oil passageway A is shut off, the second state, that is, the intermediate position, where the hydraulic oil supplying/discharging operation is not performed and the oil passageway A is shut off, and the third state, that is, the home position, where the hydraulic oil supplying/discharging operation is not performed and the oil passageway A is opened. Thus, while maintaining the functions of shifting the continuously variable transmission 18 by adjusting the amount of the hydraulic oil supplied to or discharged from the primary hydraulic cylinder 42c, and of causing the thrust ratio control oil pressure Pτ from the thrust ratio control valve 118 to act on the primary hydraulic cylinder 42c during the closing-in control in which the hydraulic oil supplying/discharging operation is not performed, the hydraulic control circuit 100 is able to shut off the oil passageway A by the speed change ratio control valve UP 114 and/or the speed change ratio control valve DN 116. Hence, the size increase or cost increase of the hydraulic control circuit 100 caused by, for example, the addition of new devices for shutting off the oil passageway A, such as a switch valve, a control valve, etc., is avoided.

While the embodiment of the invention has been described in detail with reference to the drawings, the invention is also applicable in other manners.

For example, in the foregoing embodiment, the hydraulic control circuit 100 is constructed so that the oil passageway A may be shut off by the speed change ratio control valve UP 114 and/or the speed change ratio control valve DN 116 so that the thrust ratio control oil pressure Pτ from the thrust ratio control valve 118 does not act on the primary hydraulic cylinder 42c even if the hydraulic oil supplying/discharging operation by the speed change ratio control valve UP 114 and the speed change ratio control valve DN 116 is not operated. However, it is also possible to control the hydraulic control circuit 100 so that the oil passageway A is shut off independently of the speed change ratio control valve UP 114 and/or the speed change ratio control valve DN 116. For example, the hydraulic control circuit 100 may be constructed so that a switch valve that shuts off and opens the oil passageway A is provided in any portion of the oil passageway A, so that the oil passageway A may be shut off, for example, by switching the valve state of the switch valve through an signal pressure (pilot pressure) output from a solenoid valve, or by directly switching the valve state of the switch valve through the use of the solenoid valve, or the like.

Furthermore, although in the foregoing embodiment, the input shaft rotational speed $N_{IN}$ is set as a target value for the shift control of the continuously variable transmission 18. Alternatively a speed change ratio, a sheave position, etc., corresponding one-to-one to the input shaft speed $N_{IN}$ may be set as the target value instead. The sheave position represents an absolute position of the movable rotor 42b from a reference position, that is, zero in sheave position, in a direction to the axis, the reference position being defined as a position that is assumed by the movable rotor 42b when the speed change ratio γ is 1.

Furthermore, the input shaft rotational speed $N_{IN}$, the target input shaft rotational speed $N_{IN}^*$ related thereto, etc. in the foregoing embodiment may be replaced by the engine rotational speed $N_E$, the target engine rotational speed $N_E^*$ related thereto, etc., or by the turbine rotational speed $N_T$, the target turbine rotational speed $N_T^*$ related thereto, etc. Therefore, it suffices that rotational speed sensors, such as the input shaft rotational speed sensor 56 and the like, be appropriately provided in accordance with the rotational speed that needs to be controlled.

Furthermore, although in the foregoing embodiments, a torque converter 14 equipped with the lockup clutch 26 is used as a fluid drive device, the lockup clutch 26 is not required, and furthermore, the torque converter 14 may be replaced by a different fluid-type power transmission device, such as a fluid coupling that does not have a torque amplifying effect, or the like.

What have been describe above are mere example embodiments, and the invention may be carried out in various manners with various modifications or improvements on the basis of the knowledge of those of ordinary skill in the art.

While the invention has been described with reference to example embodiments thereof, it is to be understood that the invention is not limited to the described embodiments or constructions. To the contrary, the invention is intended to cover various modifications and equivalent arrangements. In addition, while the various elements of the embodiments are shown in various example combinations and configurations, other combinations and configurations, including more, less or only a single element, are also within the scope of the invention.

What is claimed is:

1. A shift control device of a vehicular continuously variable transmission in a vehicle that is provided in a power transmission path between a vehicle power source and a driving wheel, the vehicular continuously variable transmission including a primary pulley; a secondary pulley; a belt, wrapped around the two pulleys; a primary hydraulic cylinder that alters a groove width of the primary pulley; and a secondary hydraulic cylinder that alters the groove width of the secondary pulley; the shift control device comprising:

a hydraulic circuit having a shift control valve that adjusts an amount of hydraulic oil supplied to or discharged from the primary hydraulic cylinder in order to shift the continuously variable transmission, and a pressure reducing valve that outputs a predetermined oil pressure in order to cause a ratio between an oil pressure in the primary hydraulic cylinder and the oil pressure in the secondary hydraulic cylinder to be in a predetermined relationship, wherein the predetermined oil pressure is not caused to act on the primary hydraulic cylinder when the shift control valve is supplying/discharging the hydraulic oil, the predetermined oil pressure is caused to act on the primary hydraulic cylinder when the shift control valve is not supplying/discharging the hydraulic oil; and the hydraulic circuit shuts off an oil passageway connecting an output port of the pressure reducing valve and the primary hydraulic cylinder if the shift control valve, which has supplied/discharged the hydraulic oil, stops supplying/discharging the hydraulic oil when the continuously variable transmission is shifted.

2. The shift control device according to claim 1, wherein the hydraulic circuit shuts off the oil passageway by the shift control valve; and the hydraulic circuit is selectively switchable among a first state, in which the shift control valve is supplying/discharging the hydraulic oil and the oil passageway is shut off; a second state, in which the shift control valve is not supplying/discharging the hydraulic oil and the oil passageway is shut off; and a third state, in which the shift control valve is not supplying/discharging the hydraulic oil and the oil passageway is opened.

* * * * *